May 24, 1966 WU CHEN ET AL 3,253,128

OVERCOMING LIGHT LEAKAGE IN OPTICAL SENSING

Filed July 27, 1962 2 Sheets-Sheet 1

INVENTORS
WU CHEN
WILLIAM L. POLAND

BY Louis Altman
ATTORNEY

OVERCOMING LIGHT LEAKAGE IN OPTICAL SENSING

Filed July 27, 1962 2 Sheets-Sheet 2

INVENTORS
WU CHEN
WILLIAM L. POLAND
BY
Louis Altman
ATTORNEY

United States Patent Office 3,253,128

Patented May 24, 1966

3,253,128

OVERCOMING LIGHT LEAKAGE IN OPTICAL SENSING

Wu Chen, Fairfield County, and William L. Poland, South Norwalk, Conn., assignors to Sperry Rand Corporation, New York, N.Y., a corporation of Delaware Filed July 27, 1962, Ser. No. 212,936
5 Claims. (Cl. 235—61.11)

This invention relates to optical sensing, particularly as it is employed in the sensing of perforated data records.

Information recorded in the form or holes punched in a data record (e.g. a tabulating card or punched tape) can be read by shining thereon a beam of light or other radiation to which the record is substantially opaque. If a hole is punched in the record at the place where the beam of radiation strikes, substantially all the radiation passes through the hole and the resulting high level of illumination can be sensed and interpreted as an indication of the presence of the hole. If there is no hole at the place where the beam strikes, the illumination is substantially blocked and the resulting low level of illumination is sensed and interpreted as an indication of the absence of a hole. In other areas of the technology, such as edge-sensing of perforated records or other objects, when the edge of the object is interposed in the path of the radiation it too can be sensed by means of the resulting reduction in illumination level.

But in such applications a problem arises whenever the object to be sensed is not perfectly opaque to the radiation employed. This is often the case when the object is a thin sheet; the term "sheet" being used here and in the appended claims to include any substantially planar object such as a tabulating card, perforated tape, a paper web which is edge-sensed, and the like. For example, where visible light is employed to sense or "read" a standard tabulating card (thickness 0.007 of an inch) there is often a significant amount of light leakage through the thin, slightly translucent body of the card. Such light leakage may also occur in other situations, as where edge-sensing techniques are employed in connection with thin, slightly translucent paper webs. In either case the leakage radiation can be regarded as background "noise" which increases the difficulty of distinguishing a true "signal" level of illumination. Similar problems can arise with any type of radiation employed. Photons of any frequency, visible or invisible, and also streams of particles, whether of subatomic or larger size, may all be considered "radiation" for the purposes of this specification and claims.

Accordingly, it is broadly an object of this invention to provide an improved optical sensing device. Specifically, it is intended to improve the accuracy and reliability of such devices through an increase in the signal-to-noise ratio in such devices. A further object is to reduce the criticality of design requirements for the sensing circuitry employed in such devices.

These objectives may be achieved by discriminating between leakage radiation and signal radiation according to one or more of their differing properties. For example, a compact beam of light directed along a particular path will not retain its compact form being partly transmitted through a slightly translucent sheet. Instead, the transmitted light is largely scattered by the material of the sheet. Furthermore, if the incident beam is not perpendicular to the plane of the translucent sheet, the greatest intensity of transmitted light is refracted toward a more nearly perpendicular path. By exploiting these differences, optical sensing apparatus is arranged in accordance with this invention so that it senses a larger fraction of the total available signal illumination than it does of the total available leakage illumination. Thus, the effective signal-to-noise ratio is increased.

According to one feature of this invention, there is provided optical sensing apparatus which includes means for maintaining the sheet oriented in a selected plane at a selected location, a source positioned on one side of the selected plane for directing radiation toward the selected location so that it is partly blocked when sheet material is present at that location, and means positioned on the other side of the selected plane for sensing the intensity of radiation traversing the selected location in order to determine the presence or absence of the sheet at that location. Then the radiation source and the sensing means are offset on opposite sides of a straight line extending through the selected location perpendicular to the selected plane, in order to position the sensing means out of the deflected path of the maximum intensity leakage radiation.

According to another feature of this invention, the sensing means includes a radiation-receiving surface which is spaced a distance from the selected location, while the area of this surface is substantially smaller than the area over which the leakage radiation is scattered at that same distance from the selected location, in order to substantially reduce the amount of leakage radiation intercepted thereby.

According to a further feature of this invention, the apparatus includes means for converging the radiation, and the radiation-receiving surface has an area not substantially larger than necessary to intercept all the converging radiation so that reduction in the amount of scattered leakage radiation intercepted is accomplished without any concomitant reduction in the amount of unscattered signal radiation which is intercepted by the radiation-receiving surface.

The features and objects briefly summarized above will now be fully described with reference to the accompanying drawings, in which.

Figure 4:
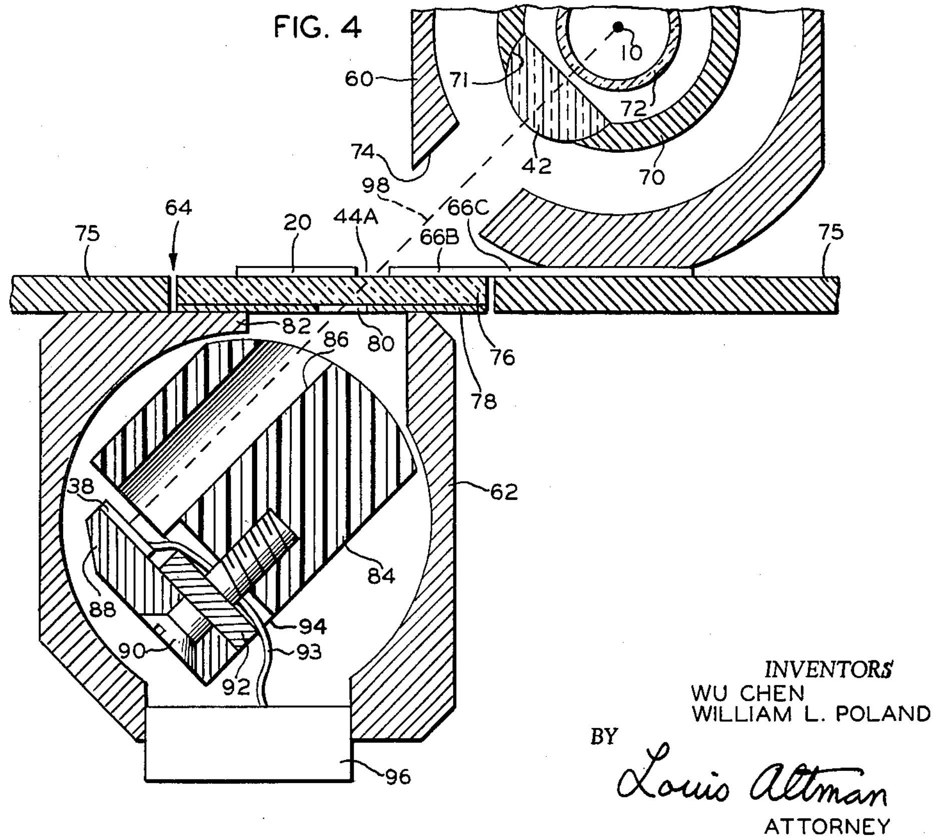
Figure 3:
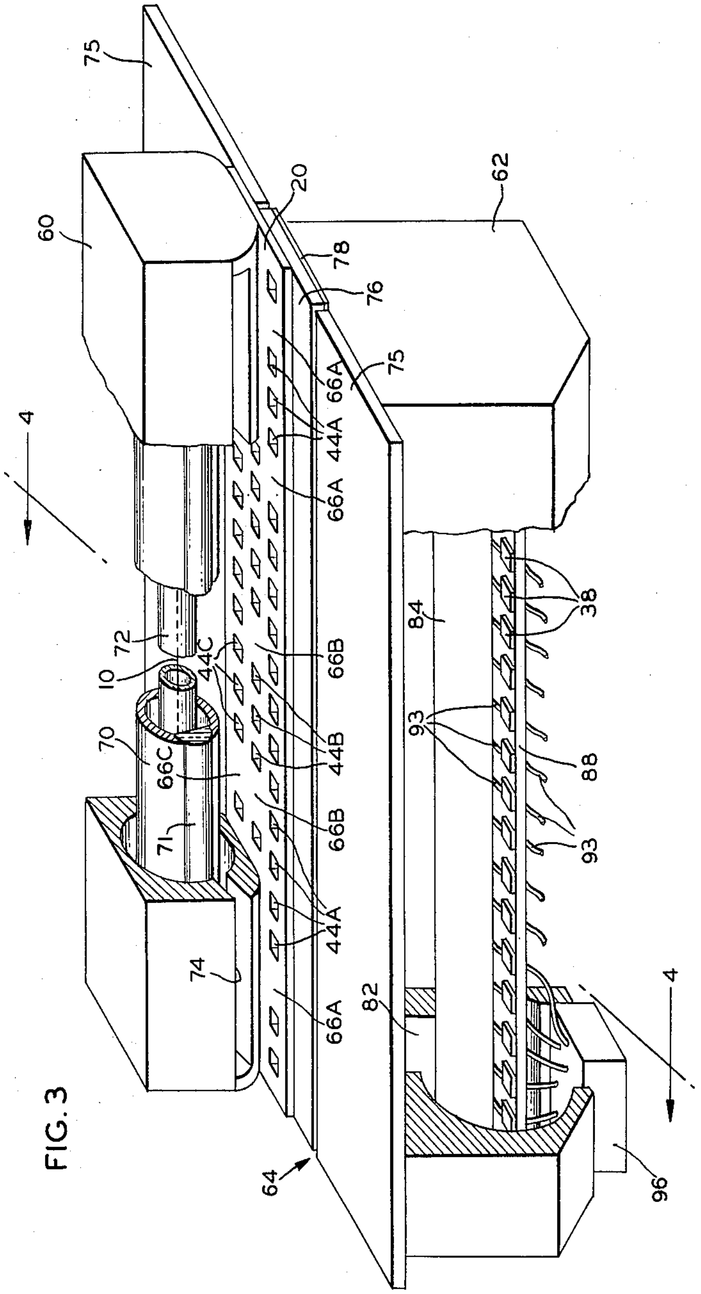
FIG. 3 is a perspective representational view of optical sensing apparatus in accordance with this invention.

And FIG. 4 is a sectional view taken along the lines 4—4 of FIG. 3.

Figures 1, 2:
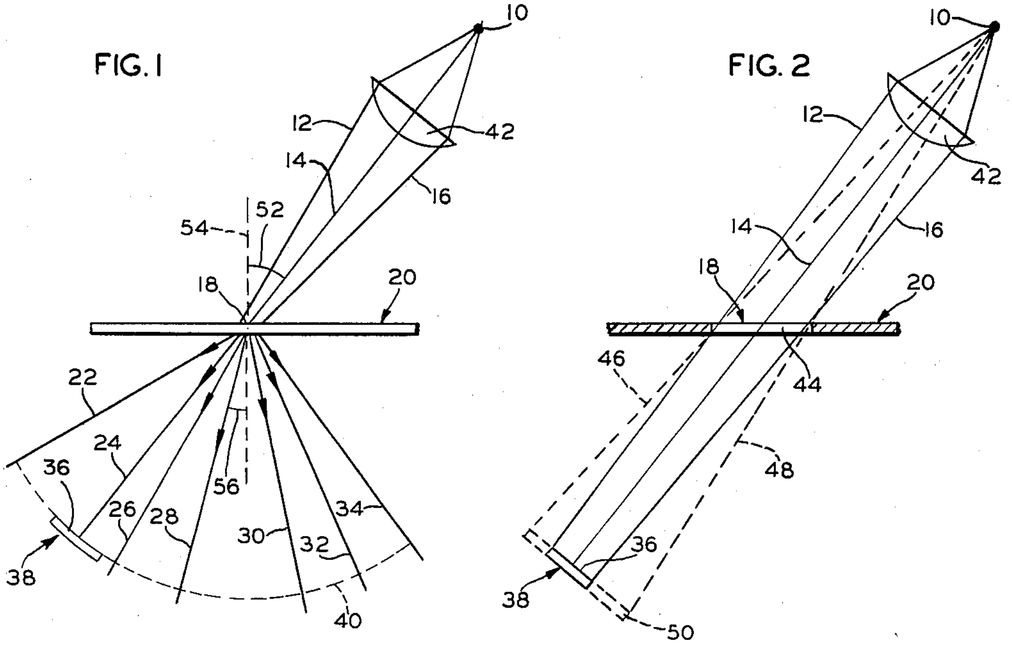
FIG. 1 is a schematic representation of a part of an optical sensing system in accordance with this invention, showing the passage of leakage illumination through an unperforated portion of a data-tabulating card.
FIG. 2 is a similar schematic representation, but shows the path taken by signal illumination through a data-representing hole punched in the card.

Referring to these drawings, FIG. 1 schematically illustrates an incandescent wire filament 10, seen in end view, which directs light rays 12–16 toward a selected location 18 on a thin sheet, which may be an unperforated portion of a tabulating card 20. Such a card is substantially but not perfectly opaque; i.e. it is sufficiently translucent to transmit a small part of the incident illumination 12–16 as weak rays 22–34 of leakage light. Some of these, such as the ray 24, strikes the light-receiving surface 36 of a semiconductor photocell 38 and are sensed thereby to generate a low level spurious signal even though no hole is punched in the selected card location 18. The conventional sensing circuitry (not shown) to which the photocell 38 is connected must then discriminate critically between this low noise level and the higher signal level which is generated by full strength illumination. Increasing the ratio of this signal level to that of the leakage noise therefore results in greater accuracy and reliability of discrimination, and permits a lowering of the criticality of design requirements for the sensing circuitry.

As seen in FIG. 1, the leakage rays 22–34 are scattered over a wide range (indicated by the broken line 40) as they emerge from the card 20. Taking advantage of this, photocell 38 is spaced a substantail distance from the selected card location 18. As a result, the leakage rays 22–34 are given room to scatter before reaching the photocell. Then the area of the radiation-receiving surface 36 of the photocell 38 is made substantially smaller than the area over which the leakage rays are scattered by the card 20 at that same distance. Thus in the profile view of FIG. 1 the transverse width of the surface 36 is seen to be much smaller than the corresponding width of the leakage scattering area 40. As a result of the scattering and of the smaller area of the light-receiving surface 36 the photocell 38 intercepts only a minor fraction of the leakage illumination 22–34; i.e. it intercepts leakage in the vicinity of the ray 24, but not in the vicinity of the other rays 22 and 26–34.

In order to achieve an increase in the signal-to-noise ratio, however, it is not enough merely to reduce the amount of leakage illumination sensed. This must be accomplished without also suffering a comparable reduction in the amount of signal illumination sensed. Therefore there are limits on how far the area of the light-receiving photocell surface 36 can be reduced before further reduction would no longer improve performance. In order to postpone this point of diminishing returns, there is provided a lens 42 of the type which converges the rays 12–16 of signal illumination. Alternately, a concave mirror (not shown) could be employed to converge the rays. In FIG. 1 it is seen that as to the leakage rays 22–34 this convergence is destroyed when the rays are scattered in passing through the card 20. Consequently leakage illumination 22–34 is not concentrated on the photocell 38 despite the presence of the lens 42. In contrast, FIG. 2 illustrates that when a data-representing hole is punched in the selected card area 18 to allow the signal illumination to pass freely therethrough, the area of concentration of the signal illumination is substantially reduced by the convergence of the rays 12–16. This permits a smaller light-receiving photocell area 36 to be employed, thus intercepting less of the scattered leakage illumination 22–34 while still catching nearly all of the converging signal illumination 12–16. The broken lines of FIG. 2 illustrate the diverging signal beam 46, 48, that would be radiated in the absence of the lens 42; and the substantially larger photocell 50 which would be required to intercept substantially all of this beam 46, 48. Such a photocell 50 would intercept a larger fraction of the leakage illumination 22–34 (FIG. 1) than does the smaller photocell 38, without sensing any greater fraction of the signal illumination 12–16 or 46, 48.

Referring again to FIG. 1, it is seen that when the leakage illumination 22–34 emerges from the card, one of the leakage rays 24 is aligned with the central ray 14 of the signal beam 12–16, while the other leakage rays 22 and 26–36 are scattered in various other directions. The arrows which coincide with the respective leakage rays 22–36 are of various lengths chosen to represent the relative intensities of illumination directed along the paths of these rays, thus giving a graphic representation of the distribution of leakage intensities as a function of the direction of scattering.

In the illustrated example it is seen that when the incident illumination 12–16 strikes the card 20 at an angle 52 to a line extending perpendicular to the plane of the card at the selected location (broken line 54), the maximum intensity of leakage illumination is not transmitted in a straight line (i.e. along the ray 24), but instead is refracted by the card material along the ray 28, which is oriented more nearly perpendicular to the plane of the card 20; note that the angle 52 which the central ray 14 of the incident beam makes with the perpendicular line 54 is larger than the angle 56 which the maximum intensity leakage ray 28 makes therewith. Consequently, by offsetting the light source 10 and photocell 38 on opposite sides of the perpendicular line 54 as shown in FIG. 1, the photocell 38 is positioned out of the path of the maximum intensity leakage ray 28, and intercepts only rays of lesser intensity such as the ray 24.

FIG. 2 illustrates the contracting result obtained when a hole 44 is punched in the selected card location 18. The signal beam 12–16 is not deflected but travels along a straight line to direct full strength signal illumination on the photocell 38. It will therefore be appreciated that for this additional reason the photocell 38 senses nearly all of the total available signal illumination (FIG. 2), but only a fraction of the total available leakage (FIG. 1), thus raising the effective signal-to-noise ratio.

FIGS. 3 and 4 illustrate an actual embodiment of an optical card reader employing the features described. This includes an upper housing 60 for the light source, a lower housing 62 for the photocell assembly, and a supporting table 64 over which the tabulating card 20 is advanced. It will be appreciated that the length dimension of the card 20 is oriented in the left-right direction of FIG. 3, and that a typical card contains many lines (including longitudinal rows and transverse columns) of holes or unpunched hole locations. For example, the rows A, B and C each comprise many holes 44 or hole locations 66 extending lengthwise of the card. In order to read an entire row such as B at once, the illustrated apparatus comprises a large number of individual reading units extending row-wise, one for each hole 44B or hole location 66B. The view of FIG. 4 represents a vertical section illustrating one of the individual reading units. The others are identical thereto.

The upper housing 60 extends row-wise and is offset to the rear of the particular row selected for reading, e.g. row A. It contains an enclosure 70 which is provided with a light port in the form of a row-wise-extending opening 71. The term "light port" is used in this specification and the appended claims to mean any space which is not occupied by an opaque object. It therefore includes an opening which is not occupied by an solid object, as well as one which is occupied by a transparent object. The opening 71 falls into the latter classification; it serves as the mounting for the row-wise extending converging lens 42. Within the enclosure 70 is a row-wise extending glass light bulb envelope 72 containing the row-wise extending incandescent filament 10. The latter directs illumination through the lens 42 and through another light port consisting of a row-wise extending opening 74 in the upper housing 60.

The members just mentioned are all extended row-wise as described so as to aim such illumination upon the selected row A of holes 44A and hole locations 66A. In order to scan successive rows A, B, C, etc. of the card 20 as well as successive cards, the cards are advanced by conventional mechanisms (not shown) transversely to the row-wise direction through a narrow space between the upper housing 60 and the supporting table 64 and then on across the table, which serves to maintain the card 20 in the proper plane. This table 64 includes front and rear metal sections 75. But at the place where the card 20 is interposed across the path of light issuing from the opening 74 of the upper housing 60, there is a row-wise extending opening between the sections 75. At this place the supporting table 64 comprises a row-wise extending glass aperture plate 76 mounted in the opening and secured to the lower housing 62. The upper surface of the aperture plate 76 is flush with that of the sections 75 so that the card 20 continues to be maintained in the same plane. The lower surface is coated with an opaque film 78, for example a metal plated thereon, which blocks stray illumination. The opaque coating 78, however, is etched to form a row-wise extending row of light ports in the form of apertures such as 80 (FIG. 4) positioned below the respective holes 44 and hole locations 66 of the selected row A so that the direct rays of the signal illumination can pass therethrough wherever the card 20 permits.

Such illumination than slants diagonally from the rearwardly offset upper housing 60 through a light port in the form of a row-wise extending opening 82 into the row-wise extending lower housing 62 which is offset to the front of the selected row A. Within this housing is mounted a row-wise extending carrier bar 84 formed of an insulating material such as plastic and secured at both ends to the housing 62. The bar 84 has a row-wise extending row of through bores such as 86 (FIG. 4) formed therein, one for each reading unit, to provide a continuation of the path of the signal illumination. Each one of a row-wise extending row of photocells 38 is mounted in position to receive such illumination at the other end of a respective bore 86 by a row-wise extending metal terminal strip 88 to which the photocells 38 are secured by means of a conductive cement. The terminal strip 88 is fastened to the carrier bar 84 by means of one or more bolts such as 90. A row-wise extending spacer strip 92 serves to space the terminal strip 88 and photocells 38 from the carrier bar 84. The terminal strip 88 makes a common electrical connection to all the photocells 38, while the other connection is made thereto by individual lead wires 93 which pass through transverse channels 94 (FIG. 4) formed in the carrier bar 84 and are all connected to a multi-lead plug terminal receptacle 96 received in an opening at the bottom of the lower housing 62. Connection is then made thereto by means of a suitable mating plug unit (not shown). In the structure described the material of the bar 84 between adjacent bores 86 serves as a light-barrier partition to prevent cross-talk which would occur if the light directed at one photocell 38 were to be scattered laterally toward an adjacent photocell.

It will be seen that this arrangement results in the spacing of the photocells 38 a substantial distance from the selected card locations 44A and 66A, thus giving the leakage illumination room to scatter before impinging on the photocells 38. Further, the use of the lens 42 in the structure described converges the signal illumination so that a smaller photocell 38 can be used to intercept less ot the scattered leakage while still sensing nearly all of the signal illumination. Finally, the offsetting of the upper unit 60 and lower unit 62 on opposite sides of the selected row A permits the leakage illumination to slant through the card 20 along a diagonal path 98 (FIG. 4) so that the maximum intensity of leakage is deflected away from the photocells 38. These factors result in a significant improvement in the signal-to-noise ratio, with its attendant advantages of superior performance and greater ease of design.

The foregoing illustrates preferred ways of practicing this invention; but since there may be countless other specific applications of the same principles, the scope of protection is not limited to any particular examples but is defined more generally in the appended claims.

The invention claimed is:

1. Apparatus for optical sensing of a sheet, the body of which transmits leakage radiation the maximum intensity of which it deflects toward a path more nearly perpendicular to the sheet; comprising:

(a) means for maintaining the sheet in a selected plane at selected location;

(b) a source positioned on one side of the selected plane for directing radiation toward the selected location so that the radiation is partly blocked when sheet material is present at that location;

(c) and means positioned on the other side of the selected plane for sensing the intensity of radiation traversing the selected location of determine the presence of sheet material at that location;

(d) the radiation source and the sensing means being offset on opposite sides of a line extending through the selected location perpendicular to the selected plane, said sensing means being further positioned at a distance from said selected location to by-pass said maximum intensity leakage radiation which has been deflected toward said path more nearly perpendicular to said sheet.

2. Detection apparatus comprising:

(a) a sheet which transmits leakage radiation;

(b) a radiation source positioned on one side of said sheet for directing radiation toward a selected location of said sheet, said radiation being directed upon said selected location at an angle to refract the maximum leakage radiation;

(c) means positioned on the opposite side of said sheet for sensing the intensity of radiation transversing said selected location to determine the presence or absence of said sheet, said sensing means being positioned to by-pass said maximum leakage radiation which has been retracted by said sheet.

3. Detection apparatus comprising:

(a) a sheet which transmits leakage radiation;

(b) a radiation source positioned on one side of said sheet for directing radiation toward a selected location of said sheet, said radiation being directed upon said selected location at an acute angle with respect to a perpendicular line through said selected location to refract the maximum leakage radiation;

(c) sensing means positioned on the opposite side of said sheet for sensing the intensity of radiation traversing said selected location to determine the presence or absence of said sheet, said sensing means comprising a bore formed in a carrier, said bore being arranged at said acute angle with respect to said perpendicular, the opening of one end of said bore being arranged at a distance from said selected location to by-pass said maximum leakage radiation which has been refracted by said sheet, the other end of said bore adapted to retain a means to detect said radiation.

4. Detection apparatus comprising:

(a) a sheet which transmits leakage radiation;

(b) a radiation source positioned on one side of said sheet for directing radiation toward selected location of said sheet, said radiation being directed upon said selected location at an acute first angle with respect to a perpendicular line through said selected location, the maximum leakage radiation being transmitted through said sheet at a second acute angle with respect to said perpendicular line which is less than said first acute angle;

(c) sensing means positioned on the opposite side of said sheet for sensing the intensity of radiation traversing said selected location, said maximum leakage radiation transmitted at said second acute angle bypassing said sensing means.

5. Detection apparatus comprising:

(a) a sheet which transmits leakage radiation;

(b) a radiation source positioned on one side of said sheet for directing said radiation toward a selected location at a first acute angle with respect to a perpendicular line through said selected location to refract the maximum leakage radiation;

(c) sensing means positioned on the opposite side of said sheet for sensing the intensity of radiation traversing said selected location, said sensing means comprising a bore means oriented to receive said radiation, one end of said bore being arranged at a distance from said selected location to by-pass said maximum leakage radiation which has been refracted by said sheet, said maximum leakage radiation being refracted at a second acute angle with respect to said perpendicular which is less than said first acute angle, the other end of said bore adapted to retain a radiation receiver means.

References Cited by the Examiner

UNITED STATES PATENTS 2,916,624 12/1959 Angel ---------------- 250—219

MALCOLM A. MORRISON, *Primary Examiner.*

R. E. COUNCIL, *Asssitant Examiner.*